United States Patent Office 3,481,875
Patented Dec. 2, 1969

3,481,875
PIEZOELECTRIC CERAMIC COMPOSITION
Tsuneo Akashi, Masao Takahashi, and Tomeji Ohno, Tokyo, Japan, assignors to Nippon Electric Company, Limited, Tokyo, Japan, a corporation of Japan
Filed Oct. 17, 1966, Ser. No. 587,242
Claims priority, application Japan, Nov. 10, 1965, 40/69,028; Dec. 24, 1965, 40/79,737
Int. Cl. C04b 35/32, 35/28, 35/12
U.S. Cl. 252—62.9                        5 Claims

ABSTRACT OF THE DISCLOSURE

A piezoelectric ceramic composition of the formula $(Pb_u A_v)(Zr_x Ti_y Sn_z)O_3$, where A represents at least one member selected from a group consisting of calcium, strontium and barium, and $u$, $v$, $x$, $y$ and $z$ are given by: $u = 0.75$–$1.00$, $v = 0.00$–$0.25$, $u+v = 1.00$, $x = 0.00$–$0.90$, $y = 0.10$–$0.60$, $z = 0.00$–$0.65$, and $x+y+z = 1.00$, contains a set of additional constituents consisting of cobalt compound equivalent in amount to cobalt sesquioxide of from .02 to .50 weight percent and a manganese compound equivalent in amount to manganese oxide of from .02 to .50 weight percent, each of the weight percentages being the percent of the total weight of said ceramic composition.

---

Figure 1:
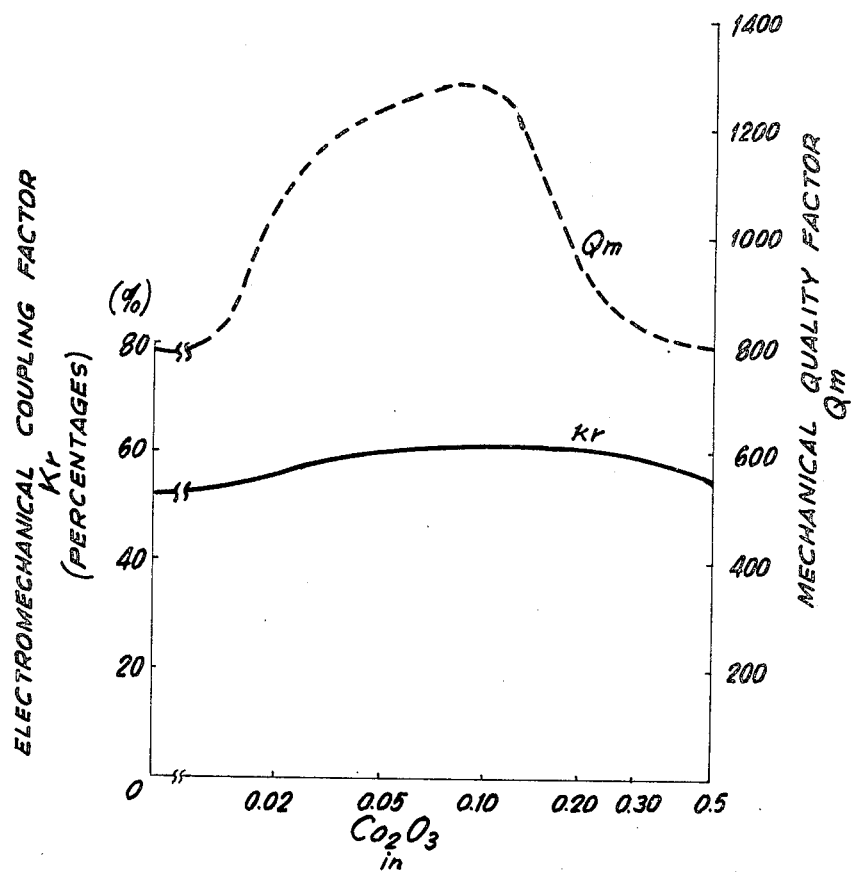

This invention relates generally to piezoelectric ceramic compositions. More particularly, this invention relates to ceramic compositions based on a formula of lead zirconate-lead titanate $PbZrO_3$-$PbTiO_3$ or on a formula lead zirconate-lead titanate-lead stannate $PbZrO_3$-$PbTiO_3$-$PbSnO_3$.

The present invention relates more particularly to lead zirconate-lead titanate-lead stannate ($PbZrO_3$-$PbTiO_3$-$PbSnO_3$) ceramic compositions which contain, in addition to such compositions, chromium sesquioxide ($Cr_2O_3$) of from 0.01 weight percent to 0.3 weight percent of the total weight and also cobalt sesquioxide ($Co_2O_3$) of from 0.02 weight percent to 0.5 weight percent.

More particularly, the present invention also relates to $PbZrO_3$-$PbTiO_3$-$PbSnO_3$ ceramic compositions which contain, in addition to such compositions, manganous oxide (MnO) of from 0.02 weight percent to 0.5 weight percent of the total weight and also cobalt sesquioxide ($Co_2O_3$) of from 0.02 weight percent to 0.5 weight percent.

A general object of this invention is to provide ceramic compositions having large electromechanical coupling factors and large mechanical quality factors.

A further object of this invention is to provide piezoelectric materials which have both large electromechanical coupling factors and large mechanical quality factors for use as elements of ceramic electric wave filters and as transducer elements of mechanical filters.

It can be established that a lead zirconate-lead titanate solid solution $(Pb(ZrTi)O_3)$, obtained by sintering a mixture of lead zirconate $PbZrO_3$ and lead titanate $PbTiO_3$, has piezoelectric properties which are stable against change of temperature and elapse of time and that strong piezoelectric activities are achieved in the neighborhood of $x = 0.52$–$0.54$ in $Pb(Zr_x:Ti_{1-x})O_3$.

Fundamental measures for evaluating the piezoelectric properties of a piezoelectric material are its electromechanical coupling factor and its mechanical quality factor. The electromechanical coupling factor represents the efficiency of transforming electric oscillation into mechanical vibration and, conversely, of transforming mechanical vibration into electric oscillation. The mechanical quality factor represents the reciprocal proportion of the energy consumed by the material during the electrical and mechanical energy interconversion. A larger mechanical quality factor corresponds to a smaller energy consumption by the material, and vice versa.

Recently, attention and studies have been directed to ceramic electric wave filters wherein use is made of piezoelectric ceramics as the element or elements of the filters, and to mechanical filters wherein use is also made of piezoelectric ceramics as the transducer or transducers thereof. The qualities desired for the piezoelectric ceramics used in these fields of application are as follows: For the elements of ceramic electric wave filters, the electromechanical coupling factor must have a desired value selected from a range between an extremely large value and a very small value, and the mechanical quality factor should have as great a value as possible. For the transducer elements of mechanical filters, both the electromechanical coupling factor and the mechanical quality factor must be as large as possible. Thus, the properties required for the transducer elements of mechanical filters are consistent with that particular set of properties demanded for the elements of ceramic electric wave filters in which the electromechanical coupling factor is large.

The electromechanical coupling factor determines the frequency spacing between the attenuation poles of the filter in such a manner that a greater electromechanical coupling factor produces a filter of wider frequency spacing and a smaller electromechanical coupling factor results in a filter of narrower frequency spacing. In other words, the electromechanical coupling factor of the piezoelectric material for the elements of ceramic filter must be selected in compliance with the frequency spacing between the attenuation poles of the particular filter in which the material is to be used and that factor must therefore be available or adjustable between an extremely small value and a very large value according to the characteristics of the filter. The mechanical quality factor also determines the loss in the pass band and the loss at the attenuation poles of the filter. The values desired for a filter therefore determine the lowest allowable limit of the mechanical quality factor of the piezoelectric material to be used in the filter. In other words, a piezoelectric material having a smaller mechanical quality factor than required can not provide a satisfactory filter, while a piezoelectric material having a greater mechanical quality factor than required can easily provide a filter of excellent characteristics. A greater mechanical quality factor is generally necessary for piezoelectric materials to be used in a filter of narrower pass band or for a case where a smaller electromechanical coupling factor is required.

As has so far been described, piezoelectric material for use in filters must be furnished with the electromechanical coupling factor selected from a wide range according to the characteristics and the fields of application of the particular filter and with the largest possible mechanical quality factor.

According to this invention, the basic composition of lead zirconate-lead titanate $Pb(Zr_{0.52}Ti_{0.48})O_3$ may incorporate either one of two pairs of additives above-noted, that is, $Cr_2O_3$ and $Co_2O_3$ or MnO and $Co_2O_3$, in the required amounts, and in such basic composition at least one member of the group of barium (Ba), strontium (Sr) and calcium (Ca) may replace up to 25 atom percent of the lead (Pb) contained in the basic composition.

Details of certain earlier types of replacements or substitutions in piezoelectric materials are generally described for example, in "Journal of the National Bureau of Standards," 55 (1955), 239 by B. Jaffe, R. S. Roth, and S. Marzullo and in U.S. Patents No. 2,906,710 issued to F. Kulcsar et al. on Sept. 29, 1959, and No. 3,068,177 issued to J. A. Sugden on Dec. 11, 1962.

This invention may also be expressed as residing in a piezoelectric ceramic composition whose basic composition may be a lead zirconate-lead titanate-lead stannate $PbZrO_3$-$PbTiO_3$-$PbSnO_3$ solid solution as already noted. This basic composition may be expressed by the term $$Pb(Zr_xTi_ySn_z)O_3$$

where the ranges for $x$, $y$, and $z$ are mol ratios given by $x=0.00$–$0.90$, $y=0.10$–$0.60$, $z=0.00$–$0.65$, and $$x+y+z=1.00$$

in order that the piezoelectric material may have an electromechanical coupling factor of a satisfactory value. Compositions outside of the suggested ranges are not practically operable because of their seriously reduced electromechanical coupling factors. The largest electromechanical coupling factor is obtainable in cases in which $x$, $y$, and $z$ are in the vicinities of 0.52–0.53, 0.48–0.47, and 0.00, respectively. Also, excellent piezoelectric properties are obtained even if at least one member of the group of calcium, strontium and barium may be substituted for up to 25 atom percent of the lead contained in the basic composition.

It is especially noted, as will be explained by way of example, that improvements in the characteristics of the various compositions may be brought about by the addition of cobalt sesquioxide, chromium sesquioxide and manganous oxide in the amounts and in the combinations specified hereinafter, and such improvements clearly result from the presence of coablt ions, chromium ions and manganous ions, respectively, in the lead zirconate-lead titanate ceramics. Similar cobalt compounds (for example, $CoCO_3$), other than cobalt sesquioxide ($Co_2CO_3$), may also be used in the composition so as to provide an amount of cobalt ions equal to the amount of cobalt ions provided by cobalt sesquioxide ($Co_2CO_3$) when it is used in the composition. Also, similar chromium compounds (for example, $CrCl_3$), other than chromium sesquioxide ($Cr_2CO_3$), may be used in the composition so as to provide an amount of chromium ions equal to the amount of chromium ions provided by chromium sesquioxide ($Cr_2O_3$) when it is used in the composition. Furthermore, if manganous or manganese compounds, other than MnO, are utilized, they should be used in amounts equivalent to the desired weight of MnO.

Particularizing further, the compositions of this invention may also consist of another basic composition of $Pb(Zr_xTi_ySn_z)O_3$ where $x$, $y$, and $z$ are given by the above equations and where at least one member of the group of calcium, strontium and barium may be replaced by up to 25 atom percent of lead (Pb) contained in the basic composition, and such basic composition may include additional constituents of cobalt sesquioxide ($Co_2CO_3$) of from 0.02 weight percent to 0.5 weight percent and also manganese oxide (MnO) of from 0.02 weight percent to 0.5 weight percent.

The resulting basic compositions above-noted are especially suitable as piezoelectric materials for the elements of electric wave filters and for the transducer elements of mechanical filters.

As for the piezoelectric materials to be used in the elements of ceramic electric wave filters, it is necessary that such materials provide an electromechanical coupling factor with an optimum value selected from a wide range extending from an extremely large value to a very small value, and it is also desirable for the mechanical quality factor to have as great a value as possible. This criterion is described, for example, in "Electronic Engineering," vol. 33 (1961), No. 3, pp. 171–177, by R. C. V. Macario, entitled "Design Data for Band-Pass Ladder Filters Employing Ceramic Resonators."

This invention will be better understood from the more detailed description hereinafter following when read in connection with the accompanying drawing in which:

FIG. 1 shows curves representing the electromechanical coupling factor $Kr$ for the radial mode vibration and the mechanical quality factor $Qm$, both plotted as ordinates, against abscissae representing the content of cobalt sesquioxide ($Co_2O_3$) in ceramics obtained by adding, to the composition $Pb(Zr_{0.52}Ti_{0.48})O_3$, the compound chromium sesquioxide ($Cr_2O_3$) of 0.1 weight percent and the compound cobalt sesquioxide ($Co_2O_3$) of up to 0.5 weight percent. This composition is exemplified in Table 1 hereinafter.

Figure 2:
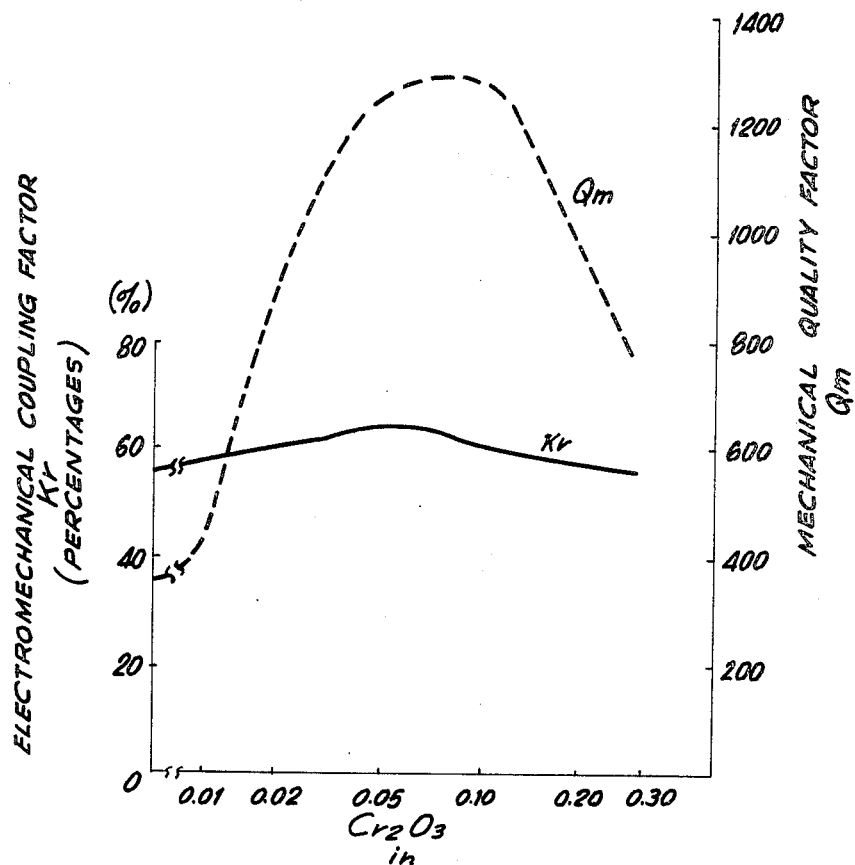

FIG. 2 shows curves representing the factors $Kr$ and $Qm$, both plotted as ordinates, against abscissae representing the content of chromium sesquioxide ($Cr_2O_3$) in ceramics obtained by adding, to the composition $Pb(Zr_{0.52}Ti_{0.48})O_3$, the compound cobalt sesquioxide ($Co_2O_3$) of 0.10 weight percent and the compound chromium sesquioxide ($Cr_2O_3$) of up to 0.3 weight percent. This composition is exemplified in Table 2 hereinafter.

Figure 3:
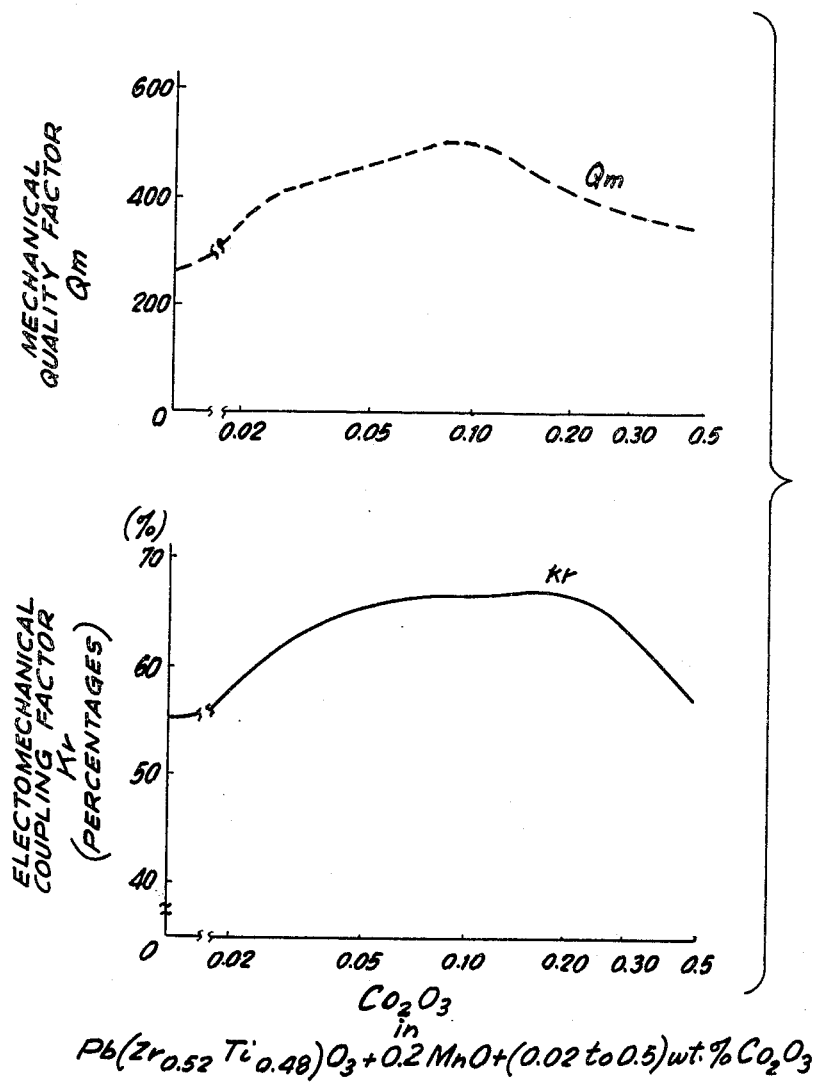
Figure 4:
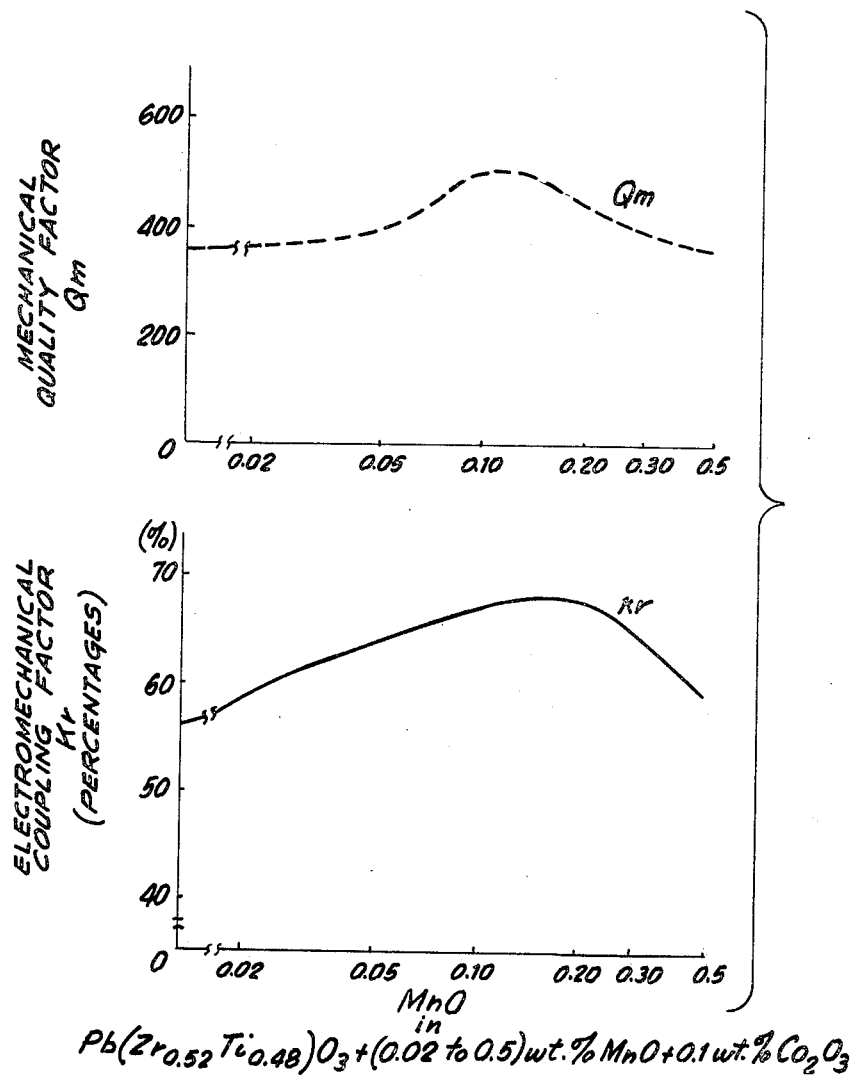

FIGS. 3 and 4 show similar curves representing the electromechanical coupling factor $Kr$ for the radial mode vibration and the mechanical quality factor $Qm$. The abscissae of FIG. 3 are related to the compound $Co_2O_3$ while the abscissae of FIG. 4 are related to the compound MnO. The curves of FIG. 3 are based on the compositions given in Table 6 while the curves of FIG. 4 are based on the compositions given in Table 7.

Example 1.—Results shown in Table 1.

So that the resulting basic composition may be represented by $Pb(Zr_{0.52}Ti_{0.48})O_3$, namely, by $x=0.52$ and $y=0.48$, a powder consisting of 50 mol percent of lead monoxide (PbO), 26 mol percent of zirconium dioxide ($ZrO_2$), and 24 mol percent of titanium dioxide ($TiO_2$), a compound of 0.10 weight percent of chromium sesquioxide ($Cr_2O_3$) as an additional constituent, and another compound of cobalt sesquioxide ($Co_2O_3$) as a further additional constituent, arranged in various proportions between 0.02 weight percent and 0.50 weight percent as indicated in Table 1, are mixed, respectively, in a ball mill. Mixed powder of the respective kinds is presintered at 900° C. for an hour, crushed, press-moulded into discs, and sintered at 1300° C. for an hour. The resulting ceramic discs are provided with silver electrodes and piezoelectrically activated through polarization treatment at 100° C. for an hour under an electric field of 50 kv./cm. After the discs have been allowed to stand for 24 hours, the electromechanical coupling factor $Kr$ for the radial mode and the mechanical quality factor $Qm$ are measured to evaluate the piezoelectric activities. Typical results are shown in Table 1.

TABLE 1

| Composition | | Kr, percent | Qm |
|---|---|---|---|
| Number: | | | |
| 1 | $Pb(Zr_{0.52}Ti_{0.48})O_3$ | 42 | 250 |
| 2 | $Pb(Zr_{0.52}Ti_{0.48})O_3$+0.10 wt. percent $Cr_2O_3$ | 52 | 780 |
| 3 | $Pb(Zr_{0.52}Ti_{0.48})O_3$+0.10 wt. percent $Cr_2O_3$+0.02 wt. percent $Co_2O_3$ | 56 | 1,070 |
| 4 | $Pb(Zr_{0.52}Ti_{0.48})O_3$+0.10 wt. percent $Cr_2O_3$+0.05 wt. percent $Co_2O_3$ [1] | 60 | 1,240 |
| 5 | $Pb(Zr_{0.52}Ti_{0.48})O_3$+0.10 wt. percent $Cr_2O_3$+0.10 wt. percent $Co_2O_3$ | 61 | 1,290 |
| 6 | $Pb(Zr_{0.52}Ti_{0.48})O_3$+0.10 wt. percent $Cr_2O_3$+0.20 wt. percent $Co_2O_3$ | 60 | 930 |
| 7 | $Pb(Zr_{0.52}Ti_{0.48})O_3$+0.10 wt. percent $Cr_2O_3$+0.30 wt. percent $Co_2O_3$ [1] | 60 | 840 |
| 8 | $Pb(Zr_{0.52}Ti_{0.48})O_3$+0.10 wt. percent $Cr_2O_3$+0.50 wt. percent $Co_2O_3$ | 55 | 800 |

[1] Cobalt carbonate $CoCO_3$ is added as calculated on the basis of $Co_2O_3$.

Comparison between the results Nos. 1 and 2 of Table 1 shows that the addition of 0.10 weight percent of $Cr_2O_3$ alone to the basic composition provides a piezoelectric material having substantially raised $Kr$ and $Qm$ factors. Further increases in the $Kr$ and $Qm$ factors, which have already been increased by the addition of $Cr_2O_3$ provide still greater improvements in the piezoelectric materials which would have wider fields of application. Comparison of the results Nos. 1 and 2 with the results Nos. 3 through 8 proves that addition of both $Cr_2O_3$ and from 0.02 weight percent to 0.50 weight percent of $Co_2O_3$ greatly increases the $Kr$ and $Qm$ factors. In general, an increase in one of the $Kr$ and $Qm$ factors results in a decrease in the other factor. However, the addition of both $Cr_2O_3$ and $Co_2O_3$ to the basic composition improves both the $Kr$ and $Qm$ factors and makes it possible to realize piezoelectric materials having $Kr$ and $Qm$ factors both of which are increased in magnitude. This material is excellent for use as the piezoelectric material in ceramic electric wave filters where a large $Kr$ factor is required and in transducers of mechanical filters.

Referring to FIG. 1, the above-mentioned relation between the content of $Co_2O_3$ and the piezoelectric properties $Kr$ and $Qm$ are plotted for results Nos. 2 through 8 of Table 1. The curves quite clearly show that excellent piezoelectric materials are produced when the content of $Co_2O_3$ falls between 0.02 weight percent and 0.50 weight percent.

If the content of $Co_2O_3$ is less than 0.02 weight percent, the combination or coexistence of $Cr_2O_3$ and $Co_2O_3$ hardly improves the piezoelectric activities achieved by the presence of $Cr_2O_3$ alone. If the content of $Co_2O_3$ exceeds 0.50 weight percent, no substantial improvement is obtained in the factors $Kr$ and $Qm$ which would otherwise be attained through the coexistence of $Cr_2O_3$ and $Co_2O_3$. More particularly, if $Cr_2O_3$ is added when the proportion of $Co_2O_3$ is greater than 0.50 weight percent, the presence of $Co_2O_3$ alters the piezoelectric properties as already noted and the addition of $Cr_2O_3$ hardly contributes to the improvement of the properties.

In view of the above, a range between 0.02 weight percent and 0.50 weight percent is selected for the effective content of $Co_2O_3$.

Example 2.—Results shown in Table 2

The results are shown in Table 2, which are obtained for a mixture of the same basic composition as that involved in Example 1, with an additional constituent of cobalt sesquioxide ($Co_2O_3$) of 0.10 weight percent, and with further additions of chromium sesquioxide ($Cr_2O_3$) of from 0.01 weight percent to 0.30 weight percent as shown in Table 2.

Comparison of the result No. 9 with the result No. 1 of Example 1 shows that addition of 0.10 weight percent of $Co_2O_3$ alone to the basic composition provides a piezoelectric material having considerably elevated $Kr$ and $Qm$ factors. It should be understood, however, that further increases in the $Kr$ and $Qm$ factors, otherwise raised by addition of $Co_2O_3$, would provide piezoelectric materials of considerable improvement and having wider fields of application. Such further increases are achieved, as shown in Table 2, by addition of both $Cr_2O_3$ and $Co_2O_3$.

Referring to FIG. 2, the piezoelectric properties $Kr$ and $Qm$ are plotted versus the content of $Cr_2O_3$ with respect to the results cited in Table 2 and to the result No. 5 of Table 1. The curves quite clearly show that excellent piezoelectric materials are obtainable when the content of $Cr_2O_3$ falls between 0.01 weight percent and 0.30 weight percent.

Even with coexistence of $Cr_2O_3$ as additives to the basic composition above-noted, less than 0.01 weight percent of $Cr_2O_3$ hardly improves the piezoelectric properties otherwise attained by the addition of $Co_2O_3$ alone. Also, when more than 0.30 weight percent $Cr_2O_3$ is added, improvement in the properties by coexistence of $Cr_2O_3$ and $Co_2O_3$ is hardly expected.

In view of the above, the effective content of $Cr_2O_3$ has been found to fall within a range between 0.01 weight percent and 0.30 weight percent for obtaining improved piezoelectric properties.

As already suggested above, the improvements made in the piezoelectric properties by the addition of $Cr_2O_3$ and $Co_2O_3$ clearly result from presence of chromium and cobalt ions. Chromium and cobalt ions may be introduced into the combination in various ways. Either chromium and cobalt oxides by themselves, or compounds thereof, which are easily decomposed at higher temperatures into the respective oxides such as shown in Tables 1 and 2, may be added to the powder of the raw materials of the basic composition during mixture thereof. For obtaining chromium ions, chromium sulfate $[Cr_2(SO_4)_3]$ or the like may be substituted for chromium sesquioxide ($Cr_2O_3$). For obtaining cobalt ions, cobalt carbonate ($CoCO_3$) or the like may be used instead of cobalt sesquioxide ($Co_2O_3$). These chromium and cobalt compounds, other than $Cr_2O_3$ and $Co_2O_3$, should be used in their respective amounts which are equivalent to the desired amounts of $Cr_2O_3$ and $Co_2O_3$, as exemplified by the results Nos. 4 and 7 in Table 1 and the result No. 13 in Table 2. In this connection, it should be understood that chromium sesquioxide ($Cr_2O_3$ or cobalt sesquioxide ($Co_2O_3$), as these terms appear hereinafter, may also mean the respective chromium or cobalt compounds which is easily decomposed at higher temperatures into chromium sesquioxide ($Cr_2O_3$) or cobalt sesquioxide ($Co_2O_3$).

Example 3.—Results shown in Table 3

Piezoelectric characteristics are shown in Table 3 for typical ceramics obtained by selecting values of 0.50–0.55 and 0.50–0.45 for $x$ and $y$, respectively, in the formula $Pb(Zr_xTi_y)O_3$ and for those derived by adding thereto 0.10 weight percent of $Cr_2O_3$ and 0.10 weight percent of $Co_2O_3$.

TABLE 2

| Number | Composition | Kr, percent | Qm |
|---|---|---|---|
| 9 | $Pb(Zr_{0.52}Ti_{0.48})O_3 + 0.10$ wt. percent $Co_2O_3$ | 56 | 350 |
| 10 | $Pb(Zr_{0.52}Ti_{0.48})O_3 + 0.01$ wt. percent $Cr_2O_3 + 0.10$ wt. percent $Co_2O_3$ | 58 | 440 |
| 11 | $Pb(Zr_{0.52}Ti_{0.48})O_3 + 0.02$ wt. percent $Cr_2O_3 + 0.10$ wt. percent $Co_2O_3$ | 60 | 900 |
| 12 | $Pb(Zr_{0.52}Ti_{0.48})O_3 + 0.05$ wt. percent $Cr_2O_3 + 0.10$ wt. percent $Co_2O_3$ | 64 | 1,270 |
| 13 | $Pb(Zr_{0.52}Ti_{0.48})O_3 + 0.20$ wt. percent $Cr_2O_3$ [1] $+ 0.10$ wt. percent $Co_2O_3$ | 57 | 990 |
| 14 | $Pb(Zr_{0.52}Ti_{0.48})O_3 + 0.30$ wt. percent $Cr_2O_3 + 0.10$ wt. percent $Co_2O_3$ | 56 | 780 |

[1] $Cr_2(SO_4)_3$ was added as calculated on the basis of $Cr_2O$

TABLE 3

| Composition | Kr, percent | Qm |
|---|---|---|
| Number: | | |
| 15 ............ $Pb(Zr_{0.50}Ti_{0.50})O_3$ | 29 | 340 |
| 16 ............ $Pb(Zr_{0.50}Ti_{0.50})O_3$+0.10 wt. percent $Cr_2O_3$+0.10 wt. percent $Co_2O_3$ | 55 | 1,330 |
| 17 ............ $Pb(Zr_{0.53}Ti_{0.47})O_3$ | 41 | 300 |
| 18 ............ $Pb(Zr_{0.53}Ti_{0.47})O_3$+0.10 wt. percent $Cr_2O_3$+0.10 wt. percent $Co_2O_3$ | 60 | 1,270 |
| 19 ............ $Pb(Zr_{0.55}Ti_{0.45})O_3$ | 39 | 320 |
| 20 ............ $Pb(Zr_{0.55}Ti_{0.45})O_3$+0.10 wt. percent $Cr_2O_3$+0.10 wt. percent $Co_2O_3$ | 56 | 1,320 |

Table 3 clearly shows that changes of $x$ and $y$ in the ceramic materials as noted, whose basic compositions are given by the above formulae, do not materially affect the piezoelectric properties otherwise improved by the coexistence of $Cr_2O_3$ and $Co_2O_3$.

As a matter of fact, the compositions, improved by the addition of both $Cr_2O_3$ and $Co_2O_3$, have excellent properties for use in manufacturing the elements of ceramic electric wave filters and the transducers of mechanical filters.

Example 4.—Results shown in Table 4

Table 4 shows the piezoelectric properties of $Kr$ and $Qm$ for ceramics given by the formula $Pb(Zr_xTi_ySn_z)O_3$, where $x=0.47$, $y=0.48$, and $z=0.50$ and where $x=0.42$, $y=0.48$, and $z=0.10$ and those obtained by adding thereto 0.10 weight percent of $Cr_2O_3$ and 0.10 weight percent of $Co_2O_3$.

an excellent piezoelectric material by addition of both $Cr_2O_3$ and $Co_2O_3$, with the basic compositions consisting not only of lead titanate-lead zirconate solid solution but also of lead titanate-lead zirconate-lead stannate solid solution and, still further, with compositions in which a portion of the lead in these solid solutions is replaced by at least one alkaline earth metal.

As already observed, the piezoelectric ceramic composition improved as above noted can not be obtained by the addition of either $Cr_2O_3$ or $Co_2O_3$ alone, but only by the addition of both $Cr_2O_3$ and $Co_2O_3$. It is further noted that the piezoelectric properties referred to are achieved through a polarization treatment performed at temperatures (about 50° C.–150° C.) higher than room temperature. The polarization treatment, if carried out at room temperature, reduces the value of $Kr$. Consequently, polarization at room temperature is consistent with the object of this invention.

TABLE 4

| Composition | Kr, percent | Qm |
|---|---|---|
| Number: | | |
| 21 ............ $Pb(Zr_{0.47}Ti_{0.48}Sn_{0.05})O_3$ | 40 | 280 |
| 22 ............ $Pb(Zr_{0.47}Ti_{0.48}Sn_{0.05})O_3$+0.10 wt. percent $Cr_2O_3$+0.10 wt. percent $Co_2O_3$ | 58 | 1,260 |
| 23 ............ $Pb(Zr_{0.42}Ti_{0.48}Sn_{0.10})O_3$ | 41 | 300 |
| 24 ............ $Pb(Zr_{0.42}Ti_{0.48}Sn_{0.10})O_3$+0.10 wt. percent $Cr_2O_3$+0.10 wt. percent $Co_2O_3$ | 57 | 1,320 |

Comparison of the result No. 5 of Table 1 with the results of Table 4 clearly shows that the substitution of tin for a portion of the basic composition does not harm the piezoelectric properties otherwise improved by the coexistence of $Cr_2O_3$ and $Co_2O_3$. In other words, the piezoelectric properties of the ceramic materials having tin substituted for a part of the basic compositions are improved by the coexistence of $Cr_2O_3$ and $Co_2O_3$ as much as the ceramic materials having no tin substitution.

Example 5.—Results shown in Table 5

Table 5 shows the results obtained by substituting barium, strontium, and/or calcium for 5 atom percent of the lead in the composition No. 24 given in Table 4.

Example 6.—Results shown in Table 6

In order that the resulting basic composition may be represented by the formula $Pb(Zr_{0.52}Ti_{0.48})O_3$, such composition was set up from a powder consisting of 50 mol percent of lead monoxide (PbO), 26 mol percent of zirconium dioxide ($ZrO_2$), and 24 mol percent of titanium dioxide ($TiO_2$), to which was supplied a compound of 0.02 weight percent of manganous oxide (MnO) as an additional constituent, and then a compound of cobalt sesquioxide ($Co_2O_3$) of from 0.02 weight percent to 0.50 weight percent, as exemplified in Table 6, was added. These were mixed, respectively, in a ball mill. The mixed powder of the respective kinds was pre-sintered at 900°

TABLE 5

| No. | Composition | Kr, percent | Qm |
|---|---|---|---|
| 25 ...... | $(Pb_{0.95}Ba_{0.05})(Zr_{0.42}Ti_{0.48}Sn_{0.10})O_3$+0.10 wt. percent $Cr_2O_3$+0.10 wt. percent $Co_2O_3$ | 58 | 1,280 |
| 26 ...... | do | 60 | 1,250 |
| 27 ...... | do | 56 | 1,260 |

As is seen from Table 5, the piezoelectric properties are equally well improved by the coexistence of $Cr_2O_3$ and $Co_2O_3$ for both compositions in which there has been a substitution of at least one alkaline earth metal selected from the group of any of the elements barium, strontium, and calcium for a portion of the basic composition and for compositions having no such substitution.

Examples 4 and 5 show that it is possible to provide

C. for an hour, crushed, press-moulded into discs, and sintered at 1300° C. for an hour. The resulting ceramic discs were provided with silver electrodes and piezoelectrically activated at 100° C. for an hour under an electric field of 50 kv./cm. After the discs had been allowed to stand for 24 hours, the electromechanical coupling factor $Kr$ for the radial mode vibration and the mechanical quality factor $Qm$ were measured to evaluate the piezoelectric activities. Typical results obtained for the several cases are shown in Table 6.

to a large extent, which were augmented by the addition of $Co_2O_3$ to the basic composition, would provide piezo-

TABLE 6

| Number: | Composition | Kr, percent | Qm |
|---|---|---|---|
| 1 | $Pb(Zr_{0.52}Ti_{0.48})O_3$ | 42 | 250 |
| 2 | $Pb(Zr_{0.52}Ti_{0.48})O_3+0.20$ wt. percent MnO | 55 | 260 |
| 3 | $Pb(Zr_{0.52}Ti_{0.48})O_3+0.20$ wt. percent MnO+0.02 wt. percent $Co_2O_3$ | 59 | 360 |
| 4 | $Pb(Zr_{0.52}Ti_{0.48})O_3+0.20$ wt. percent MnO+0.05 wt. percent $Co_2O_3$ | 66 | 471 |
| 5 | $Pb(Zr_{0.52}Ti_{0.48})O_3+0.20$ wt. percent MnO+0.10 wt. percent $Co_2O_3$ | 67 | 500 |
| 6 | $Pb(Zr_{0.52}Ti_{0.48})O_3+0.20$ wt. percent MnO+0.20 wt. percent $Co_2O_3$ [1] | 67 | 410 |
| 7 | $Pb(Zr_{0.52}Ti_{0.48})O_3+0.20$ wt. percent MnO+0.30 wt. percent $Co_2O_3$ | 64 | 537 |
| 8 | $Pb(Zr_{0.52}Ti_{0.48})O_3+0.20$ wt. percent MnO+0.50 wt. percent $Co_2O_3$ | 57 | 300 |

[1] Cobalt carbonate ($CoCO_3$) is added as calculated on the basis of $Co_2O_3$.

The results Nos. 1 and 2 of Table 6 show that the addition of 0.20 weight percent of MnO alone to the basic composition provides a piezoelectric material of a fairly elevated Kr factor. The increase in the value of Kr and Qm due to the addition of MnO provides piezoelectric materials having a wider field of application and they serve as improved piezoelectric materials. A comparison of the results Nos. 1 and 2 of Table 6 with the results Nos. 3 through 8 of this table proves that adddition of both MnO and from 0.02 weight percent to 0.50 weight percent of $Co_2O_3$ to the basic composition remarkably raises both of the factors Kr and Qm.

As already observed, an increase in one of the factors Kr and Qm results in decrease in the other. However, the addition of both MnO and $Co_2O_3$ to the basic composition as the additional constituents remarkably increases both Kr and Qm factors, thereby providing piezoelectric materials having raised Kr and Qm factors. Such materials are excellent for use in ceramic wave filters where large Kr factors are required and in transducers for mechanical filters.

Referring to FIG. 3 of the drawing, the above-mentioned relation between the content of $Co_2O_3$ and the piezoelectric properties Kr and Qm are plotted for the results Nos. 2 through 8 of Table 6. The curves quite clearly demonstrate that excelent piezoelectric materials are produced when the content of $Co_2O_3$ falls between 0.02 weight percent and 0.50 weight percent.

When the content of $Co_2O_3$ is less than 0.02 weight percent, the coexistence of MnO and $Co_2O_3$ hardly improves the piezoelectric activities achieved by the presence of MnO alone. When the content of $Co_2O_3$ exceds 0.50 weight percent, there would be substantially no improvement in the activities over that which would otherwise be attained through the coexistence of MnO and $Co_2O_3$.

In view of the above, a range between 0.02 weight percent of 0.50 weight percent is selected for the effective range of the $Co_2O_3$ content.

Example 7.—Results shown in Table 7

Table 7 shows the results obtained for a mixture of the basic composition of the same constituents as in Example 6 and an additional constituent of 0.10 weight percent of cobalt sesquioxide ($Co_2O_3$) alone and also for various mixtures with additions of manganous oxide (MnO) of from 0.02 weight percent to 0.50 weight percent as noted in Table 7.

Comparison of the result No. 1 of Example with the result No. 9 of Table 7 shows that addition of 0.10 weight percent of $Co_2O_3$ alone to the basic composition yields a piezoelectric material having fairly augmented Kr and Qm factors. Further increases in the Kr and Qm factors electric materials having a wider field of application. Such further increases are accomplished, as shown in Table 7, by addition of both MnO and $Co_2O_3$.

TABLE 7

| Number: | Composition | Kr, percent | Qm |
|---|---|---|---|
| 9 | $Pb(Zr_{0.52}Ti_{0.48})O_3+0.10$ wt. percent $Co_2O_3$ | 56 | 350 |
| 10 | $Pb(Zr_{0.52}Ti_{0.48})O_3+0.02$ wt. percent MnO+0.10 wt. percent $Co_2O_3$ | 59 | 360 |
| 11 | $Pb(Zr_{0.52}Ti_{0.48})O_3+0.05$ wt. percent MnO+0.10 wt. percent $Co_2O_3$ | 64 | 400 |
| 12 | $Pb(Zr_{0.52}Ti_{0.48})O_3+0.20$ wt. percent MnO+0.10 wt. percent $Co_2O_3$ | 68 | 450 |
| 13 | $Pb(Zr_{0.52}Ti_{0.48})O_3+0.30$ wt. percent MnO [1]+0.10 wt. percent $Co_2O_3$ | 65 | 400 |
| 14 | $Pb(Zr_{0.52}Ti_{0.48})O_3+0.50$ wt. percent MnO+0.10 wt. percent $Co_2O_3$ | 59 | 360 |

[1] $MnCO_3$ is added as calculated on the basis of MnO.

Referring to FIG. 4 of the drawing, the piezoelectric properties Kr and Qm are plotted versus the content of MnO for the results of Table 7 and the result No. 5 of Table 6. This figure clearly shows that when the content of MnO falls between 0.02 weight percent and 0.50 weight percent, excellent piezoelectric materials are obtainable.

When the content of MnO is less than 0.02 weight percent, the coexistence of MnO and $Co_2O_3$ contributes but little to the improvement of the piezoelectric activities otherwise attained by the presence of $Co_2O_3$ alone and responds little to improving the activities by the concurrent addition of MnO and $Co_2O_3$. When the content of MnO exceeds 0.50 weight percent, the properties are so rigidly-altered regardless of the presence of MnO that the coexistence of $Co_2O_3$ hardly improves the properties.

In view of the above, a range between 0.02, weight percent and 0.50 weight percent is selected for the effective range of the MnO content.

As already suggested hereinabove, the improvements made in piezoelectric properties by the addition of both MnO and $Co_2O_3$ clearly result from the presence of manganous and cobalt ions. Various ways may be employed to introduce manganous and cobalt ions into the compositions. As exemplified in Tables 6 and 7, the oxides themselves may be added, or, if desired, manganous or manganese and cobalt compounds may be employed provided they are decomposed into the respective oxides at elevated temperatures. It is thus possible to introduce manganous ions into the compositions by using, in place of manganous oxide (MnO), manganous carbonate ($MnCO_3$) or any other manganous or manganese compositions, and, to introduce cobalt ions into the compositions, to utilize cobalt carbonate ($CoCO_3$) or any other cobalt compound instead of cobalt sesquioxide ($CO_2O_3$). When manganous or manganese and cobalt compounds, other than MnO and $Co_2O_3$ are utilized, they should be used in their respective equivalent amounts to effect the desired weight of MnO and $Co_2O_3$. Use of such compounds is exemplified by the compositions No. 6 in Table 6 and No. 13 in Table 7. In this connection, it should be understood that, according to this invention, manganous oxide (MnO) and cobalt sesquioxide ($Co_2O_3$) as used throughout this application, shall also mean and include such manganous or manganese and cobalt compounds which may be thermally decomposed into manganous oxide (MnO) and cobalt sesquioxide ($Co_2O_3$), respectively.

Example 8.—Results shown in Table 8

Piezoelectric characteristics are shown in Table 8 for typical ceramics obtained by selecting 0.50–0.55 and 0.50–0.45 for $x$ and $y$, respectively, while maintaining 0.00 for $z$ in the formula $Pb(Zr_xTi_ySn_z)O_3$, by adding to such compositions 0.10 weight percent of MnO and 0.10 weight percent of $Co_2O_3$.

TABLE 8

| Number: | Composition | Kr, percent | Qm |
|---|---|---|---|
| 15 | $Pb(Zr_{0.50}Ti_{0.50})O_3$ | 29 | 340 |
| 16 | $Pb(Zr_{0.50}Ti_{0.50})O_3+0.10$ wt. percent MnO$+0.10$ wt. percent $Co_2O_3$ | 58 | 610 |
| 17 | $Pb(Zr_{0.53}Ti_{0.47})O_3$ | 41 | 300 |
| 18 | $Pb(Zr_{0.53}Ti_{0.47})O_3+0.10$ wt. percent MnO$+0.10$ wt. percent $Co_2O_3$ | 66 | 490 |
| 19 | $Pb(Zr_{0.55}Ti_{0.45})O_3$ | 39 | 320 |
| 20 | $Pb(Zr_{0.55}Ti_{0.45})O_3+0.10$ wt. percent MnO$+0.10$ wt. percent $Co_2O_3$ | 62 | 590 |

Table 8 clearly shows that change of $x$ and $y$ in the ceramic materials whose basic composition is given by the above-noted formulae does not degrade the piezoelectric properties otherwise improved by coexistence of MnO and $Co_2O_3$.

Compositions improved by the addition of both MnO and $Co_2O_3$ have excellent properties for use in manufacturing the elements of ceramic wave filters and the transducers of mechanical filters.

Example 9.—Results shown in Table 9

Table 9 shows the piezoelectric properties of ceramics given by the formula $Pb(Zr_xTi_ySn_z)O_3$ where $x=0.47$, $y=0.48$, and $z=0.05$ and where $x=0.42$, $y=0.48$, and $z=0.10$ and those obtained by adding to each of the compositions 0.10 weight percent of MnO and 0.10 weight percent of $Co_2O_3$, as indicated in Table 9.

TABLE 9

| Number: | Composition | Kr, percent | Qm |
|---|---|---|---|
| 21 | $Pb(Zr_{0.47}Ti_{0.48}Sn_{0.05})O_3$ | 40 | 280 |
| 22 | $Pb(Zr_{0.47}Ti_{0.48}Sn_{0.05})O_3+0.10$ wt. percent MnO$+0.10$ wt. percent $Cr_2O_3$ | 62 | 470 |
| 23 | $Pb(Zr_{0.42}Ti_{0.48}Sn_{0.10})O_3$ | 41 | 300 |
| 24 | $Pb(Zr_{0.42}Ti_{0.48}Sn_{0.10})O_3+0.10$ wt. percent MnO$+0.10$ wt. percent $Co_2O_3$ | 61 | 520 |

Comparison of the result No. 5 of Table 6 with Table 4 clearly shows that substitution of tin (Sn) for a portion of the basic composition does not appreciably degrade the piezoelectric properties otherwise improved by coexistence of MnO and $Co_2O_3$ without the tin substitution.

Example 10.—Results shown in Table 10

Table 10 shows the results obtained by substituting barium, strontium, and/or calcium for 5 atom percent of the lead in the composition No. 24 of Table 9.

TABLE 10

| No. | Composition | Kr, percent | Qm |
|---|---|---|---|
| 25 | $(Pb_{0.95}Ba_{0.05})(Zr_{0.42}Ti_{0.48}Sn_{0.10})O_3+0.10$ wt. percent MnO$+0.10$ wt. percent $Co_2O_3$ | 65 | 520 |
| 26 | $(Pb_{0.95}Sr_{0.05})(Zr_{0.42}Ti_{0.48}Sn_{0.10})O_3+0.10$ wt. percent MnO$+0.10$ wt. percent $Co_2O_3$ | 66 | 490 |
| 27 | $(Pb_{0.95}Ca_{0.05})(Zr_{0.42}Ti_{0.48}Sn_{0.10})O_3+0.10$ wt. percent MnO$+0.10$ wt. percent $Co_2O_3$ | 63 | 500 |

Table 10 clearly shows that the piezoelectric properties are substantially equally well improved by the coexistence of MnO and $Co_2O_3$ for both cases considered, Examples 9 and 10 show that, in accordance with this invention, an excellent piezoelectric material may be produced by the addition of both MnO and $Co_2O_3$ to the basic compositions consisting not only of lead titanate-lead zirconate solid solution but also of lead titanate-lead zirconate-lead stannate solid solution. Still further, excellent piezoelectric materials may be produced with such solid solution compositions in which a portion of the lead in these solid solutions is replaced by at least one alkaline earth metal.

While this invention has been set forth in certain particular compositions merely for illustration, it will be understood that the general principles of this invention may be applied to other and widely varied compositions without departing from the spirit of the invention and the scope of the appended claims.

What is claimed is:

1. A piezoelectric ceramic composition having a basic composition represented by the following compositional formula $$(Pb_uA_v)(Zr_xTi_ySn_z)O_3$$

where A represents at least one member selected from a group consisting of calcium, strontium, and barium, and $u$, $v$, $x$, $y$ and $z$ are given by $u=0.75–1.00$, $v=0.00–0.25$, $u+v=1.00$, $x=0.00–0.90$, $y=0.10–0.60$, $z=0.00–0.65$, and $x+y+z=1.00$, characterized in that said ceramic composition contains a set of additional constituents consisting of a cobalt compound equivalent in amount to cobalt sesquioxide of from 0.02 to 0.50 weight percent and a manganese compound equivalent in amount to manganous oxide of from 0.02 to 0.50 weight percent, each of the weight percentages being the percentage of the total weight of said ceramic composition.

2. A piezoelectric ceramic composition according to claim 1, wherein the set of said additional constituents consists of a cobalt sesquioxide of from 0.02 to 0.50 weight percent and a manganous oxide of from 0.02 to 0.50 weight percent, each of the weight percentages being the percentage of the total weight of said ceramic composition.

3. A piezoelectric ceramic composition according to claim 1, in which the piezoelectric composition has been subjected to a polarization treatment at temperatures between 50 to 150 degrees centigrade.

4. A piezoelectric ceramic composition having the following formula $$Pb(Zr_xEi_ySn_z)O_3$$

where $x=0.00-0.90$, $y=0.10-0.60$, $z=0.00-0.65$, and $x+y+z=1.00$, characterized in that said ceramic com- where at least one member of the group of barium, strontium, and calcium is substituted for a portion of the basic composition and where no such substitution is effected.
position contains a set of additional constituents consisting of cobalt sesquioxide of from 0.02 to 0.50 weight percent and manganous oxide of from 0.02 to 0.50 weight percent.

5. A piezoelectric ceramic composition having the following formula $$Pb(Zr_xTi_y)O_3$$

where $x=0.00-0.90$, $y=0.10-0.60$, and $x+y=1.00$, characterized in that said ceramic composition contains a set of additional constituents consisting of cobalt sesquioxide of from 0.02 to 0.50 weight percent and manganous oxide of from 0.02 to 0.50 weight percent.

References Cited

UNITED STATES PATENTS

| | | | |
|---|---|---|---|
| 2,961,554 | 11/1960 | Cook et al. | 252—62.9 X |
| 3,068,177 | 12/1962 | Sugden | 252—62.9 |
| 3,372,121 | 3/1968 | Banno | 252—62.9 |

TOBIAS E. LEVOW, Primary Examiner

J. COOPER, Assistant Examiner

U.S. Cl. X.R.

106—39

UNITED STATES PATENT OFFICE
CERTIFICATE OF CORRECTION

Patent No. 3,481,875                                        December 2, 1969

Tsuneo Akashi et al.

It is certified that error appears in the above identified patent and that said Letters Patent are hereby corrected as shown below:

Column 12, line 74, beginning with "4. A piezoelectric" cancel all to and including "percent." in line 10, column 13, ar insert -- 4. A piezoelectric ceramic composition having the following formula $$Pb(Zr_x Ti_y Sn_z)O_3$$

where $x = 0.00 - 0.90$, $y = 0.10 - 0.60$, $z = 0.00 - 0.65$, and $x + y + z = 1.00$, characterized in that said ceramic compositior contains a set of additional constituents consisting of cobalt sesquioxide of from 0.02 to 0.50 weight percent and manganous oxide of from 0.02 to 0.50 weight percent. --.

Signed and sealed this 27th day of October 1970.

(SEAL)
Attest:

EDWARD M. FLETCHER, JR.                               WILLIAM E. SCHUYLER,
Attesting Officer                                                   Commissioner of Patei